United States Patent
Wang et al.

(10) Patent No.: US 8,583,479 B1
(45) Date of Patent: Nov. 12, 2013

(54) CERTIFIED PROMISSORY PAYMENT METHOD FOR TRANSACTION WITH REWARD POINTS

(75) Inventors: Zhenyu Wang, New York, NY (US); Ning Zhu, New York, NY (US)

(73) Assignee: New Point Holdings Corp., New York, NY (US)

( * ) Notice: Subject to any disclaimer, the term of this patent is extended or adjusted under 35 U.S.C. 154(b) by 362 days.

(21) Appl. No.: 12/985,560

(22) Filed: Jan. 6, 2011

Related U.S. Application Data

(60) Provisional application No. 61/282,958, filed on Apr. 29, 2010.

(51) Int. Cl.
*G06Q 30/00* (2012.01)
(52) U.S. Cl.
USPC .......................................................... 705/14.17
(58) Field of Classification Search
USPC ........................................................ 705/10, 14
See application file for complete search history.

(56) References Cited

U.S. PATENT DOCUMENTS

| | | | |
|---|---|---|---|
| 7,184,980 B2 * | 2/2007 | Allen-Rouman et al. | 705/35 |
| 7,363,270 B2 * | 4/2008 | Iversen | 705/37 |
| 7,366,695 B1 * | 4/2008 | Allen-Rouman et al. | 705/39 |
| 7,783,541 B1 * | 8/2010 | Rolf | 705/35 |
| 2009/0276305 A1 * | 11/2009 | Clopp | 705/14.16 |
| 2010/0057530 A1 * | 3/2010 | Parivash et al. | 705/10 |

* cited by examiner

*Primary Examiner* — John G Weiss
*Assistant Examiner* — Christopher Stroud
(74) *Attorney, Agent, or Firm* — Michael J. Feigin, Esq.; Feigin & Associates, LLC

(57) ABSTRACT

Embodiments of the disclosed technology comprise payment for an item (any good or service) to remain in the domain or dominion of a buyer of such an item, while delivering the item to the customer and insuring payment will be made, at a future date, to the seller of the item. A special account designated for this purpose is utilized, in embodiments of the disclosed technology, to ensure that funds are kept separate and the customer or buyer cannot otherwise use the funds. However, interest, or a part thereof, on the funds are, in embodiments of the disclosed technology, awarded to the customer for use in making further purchases (in the form of "reward points") or as credit back to the customer.

19 Claims, 3 Drawing Sheets

CERTIFIED PROMISSORY PAYMENT METHOD FOR TRANSACTION WITH REWARD POINTS

FIELD OF THE DISCLOSED TECHNOLOGY

The disclosed technology relates generally to consumer transactions and more specifically to securely holding payments made by a consumer while issuing a promissory note to a seller and delivering goods to the consumer.

BACKGROUND OF THE DISCLOSED TECHNOLOGY

Transactions in the marketplace typically take place when a seller advertises or otherwise makes known that an item (good or service) is for sale and the buyer pays money in exchange for this item. Payment may be made by cash, check, electronic wiring of funds, credit card, and so forth. In most of these cases, the funds then become the seller's and the item the property of the buyer or customer. ("Buyer" and "customer" are used interchangeably in this disclosure and are defined as one desirous of acquiring an item offered for sale.)

Different methods of incentivizing a customer to purchase with a particular payment mechanism (such as reward points for a credit card) or incentivizing to make a purchase from a particular seller (such as offering discounts and special sales) are known in the art. In these cases, the customer parts with his/her money and the seller receives the money, or the funds are in transit to the seller instantaneously. On the other hand, many customers prefer to be invoiced. In this manner, the customer receives the goods, but only needs to pay later. However, when issuing an invoice, the seller is not assured that the payment will actually be made and, further, often has to invest more time and expense in trying to collect payment.

What is needed in the art is the ability to ensure payment, while allowing a buyer to make a payment at a later date; in other words, to reduce the negativities associated with commerce.

SUMMARY OF THE DISCLOSED TECHNOLOGY

An object of the disclosed technology is to reward customers for making purchases, thereby stimulating consumer spending, and invigorating commercial activity.

A further object of the disclosed technology is to gives vendors and retailers a marketing edge by extending credit to help make sales, and assurance that the vendor or retailer will be paid.

A further object of the disclosed technology is to force customers to set aside money made for purchases bought on credit, and reward customers for doing so.

An embodiment of the disclosed technology is a method of selling an item. The method includes offering an item for sale and receiving payment from a customer for purchase of said item, such as by way of a credit card, debit card, or check, as is known in the art. However, the method then proceeds by transferring the payment to a financial account associated with the customer at a financial institution having a business relationship with the customer. That is, the payment is transferred back to the customer based on customer instructions. This payment is, in embodiments of the disclosed technology, held in a specially designated account for the purpose of carrying out this financial method, and, in exchange, the seller receives a promissory note for the value of the payment (minus processing fees, such as credit card fees). The promissory note is guaranteed by the customer's bank or a third party. After receipt of the promissory note by the seller, the item is delivered to the purchaser, and the seller can redeem the promissory note, say, in one year's time. The seller then has an advantage in making the sale because the buyer still actually holds on to the money, without having control over the money. The money is there to be transmitted to the seller upon redemption of the promissory note. The customer/buyer, however, earns interest on this money. This interest, or a part thereof, is paid to the customer directly or in the form of reward points which can be used for further payments. Part of this interest may be diverted to a third party, such as a person or entity who guarantees the promissory note and/or the owners of operates methods and devices of the disclosed technology.

In another method, the payment is deferred to the seller. This is carried out by way of a third party controlling the long term transaction, or a financial institution connected with the buyer/customer. An account associated with the buyer is maintained at a financial institution. Receipt of payment into the account is negotiated, the payment to be solely used for purchase of an item sold by a seller. The seller is notified of the payment, causing the seller to deliver the item to the buyer. Payment to the seller is guaranteed and payment for the item is made to the seller after an extended period of time, such as 120 days, six months, or one year. The anticipated interest, called points (which, for purposes of this disclosure, includes interest or dividends) on the funds, while they remain in the account, is issued to the customer at the outset (such as upon making the purchase of the item or upon the funds being received into the account, or a CD [certificate of deposit] is issued). The anticipated interest is the interest which will be generated until the extended period of time lapses.

In the above method, credit to the buyer (corresponding to the interest) may be delivered to the buyer in a separate account, the credit to be used for additional purchases and being a percentage of the anticipated interest, such as 75% of the anticipated interest, while the remaining portion of the interest, such as 25%, is transferred to a third party. The third party may be the guarantor of payment to the seller. The credits given to the buyer may be in the form of reward points. Such reward points may be used to offset the cost of the item, and returned to the buyer. Or, such reward points may be used to offset the cost of possible future purchases. Bank and other financial institution processing fees incurred in the course of these transactions may be deducted from the reward points granted to the buyer. That is, the points may be issued based on interest on the actual dollar amount received by the seller (the money held in the account), or reward points may be paid to the customer only after bank fees have first been discharged, if any. The reward unit, in embodiments of the disclosed technology, is referred to as a point. Each Point may be equal to one local money unit. For example, one point, in the United States, may be equal to one U.S. dollar.

In embodiments of this method of the disclosed technology, the payment is first received into an account associated with the seller before the step of receiving payment into an account associated with the buyer. In an embodiment of the disclosed technology, the account associated with the seller is an account for receipt of payments made by cash, check, credit card or any other payment methods in the seller's regular course of business.

In another embodiment of the disclosed technology, a payment intermediary, such as a financial institution or organization carrying out the above objects of the disclosed technology, has means for receiving funds into an account for purchase of an item. Further, there are means for generating a promissory note to a vendor of the item when the funds are received. As a result of the receiving of the funds, points are associated to a purchaser of the item, the points corresponding to at least a part of, or all of the interest anticipated to accrue in the account until the promissory note is redeemable. Still further, means for making the points available to the purchaser for purchase of further goods when said promissory note is issued, are also employed. The payment intermediary may also have means for verifying delivery of the item to a purchaser. In embodiments of the disclosed technology, existing bill payment and money clearing services systems are utilized. That is, the technology may be used with prior art sale and purchase transaction structures.

In the above embodiment, a portion of funds associated with the anticipated interest is transferred to a third party. The "at least a part" of the anticipated interest which is credited to the buyer for purchase of further goods (such as in the form of reward points) is, in an embodiment of the disclosed technology, the entire anticipated interest minus the portion transferred to the third party. This may be a 25%/75% split, 75% going to the customer and 25% to the third party. The promissory note is redeemable by the note holder after one year, in embodiments of the disclosed technology.

In accordance with these and other objects, which will become apparent hereinafter, the disclosed technology will now be described with particular reference to the drawings.

A better understanding of the disclosed technology will be obtained from the following detailed description of the preferred embodiments taken in conjunction with the drawings and the attached claims.

DETAILED DESCRIPTION OF EMBODIMENTS OF THE DISCLOSED TECHNOLOGY

Embodiments of the disclosed technology comprise systems, methods, and devices for allowing a payment for an item (any good or service) to remain in the domain or dominion of a buyer of such an item, while delivering the item to the customer and insuring payment will be made, at a future date, to the seller of the item. A special account designated for this purpose is utilized, in embodiments of the disclosed technology, to ensure that funds are kept separate and the customer or buyer (used interchangeably in this disclosure) cannot otherwise use the funds. However, interest, or a part thereof, on the funds is, in embodiments of the disclosed technology, awarded to the customer for use in making further purchases (in the form of "reward points") or as credit back to the customer. In this manner, the customer is incentivized to make another purchase, as the customer effectively receives the gain on this money for a year, or at least part thereof. Part of the gain (interest or dividends, used interchangeably in this disclosure), in embodiments of the disclosed technology, is diverted to a third party. The third party may be either a person or entity effectuating transfer of funds and/or guarantees a promissory note issued to the seller of the item.

Embodiments of the disclosed technology will become clearer in view of the following description of the figures.

Figure 1:
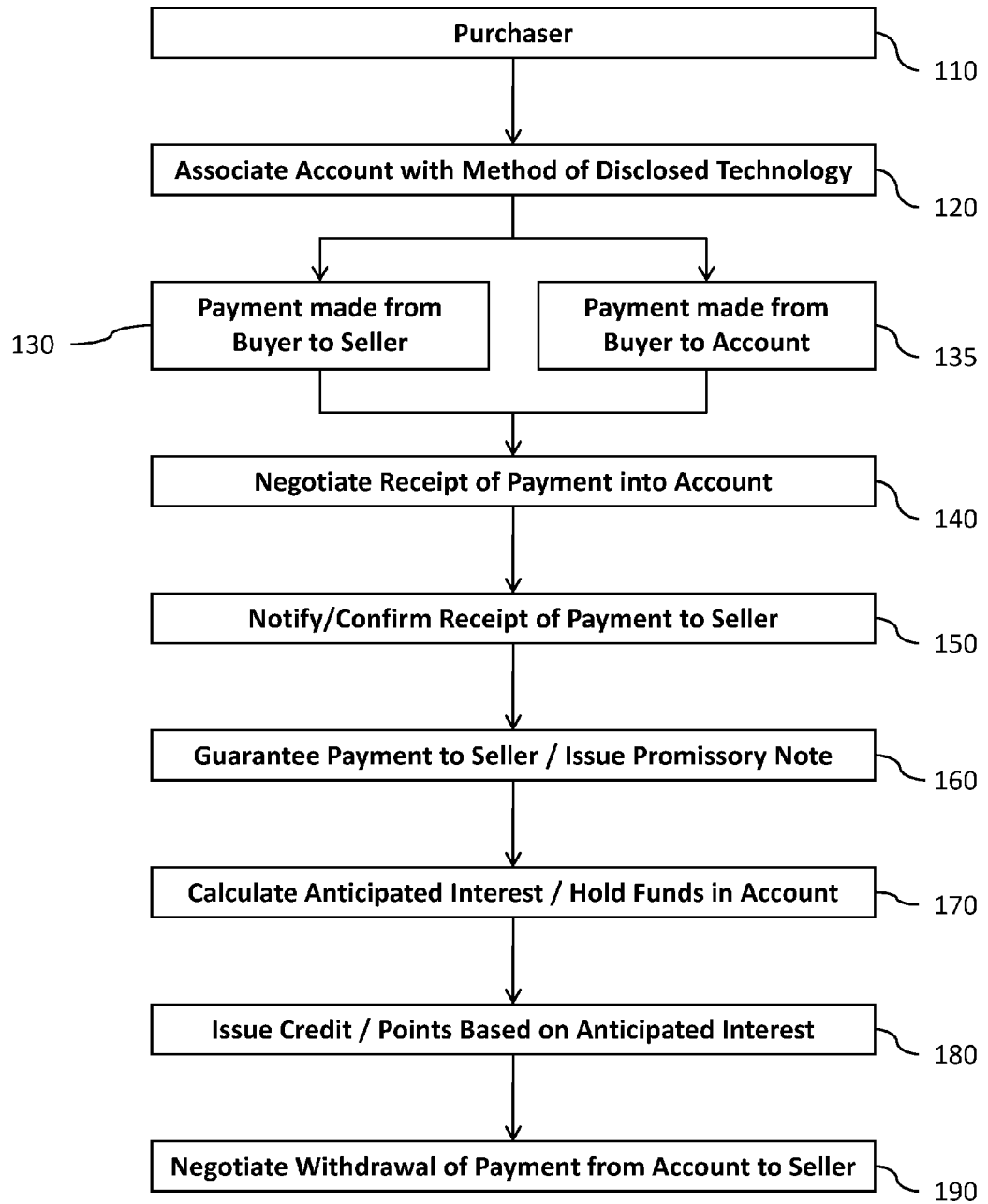
FIG. 1 shows the steps taken in a method of carrying out embodiments of the disclosed technology.

FIG. 1 shows the steps taken in a method of carrying out embodiments of the disclosed technology. In step 110, an account is created at a financial institution. This account is similar to a bank account known in the art, in that funds may be stored therein; statements may be received showing the money in the account. In embodiments, this account is effectively or entirely controlled by the financial institute (the bank) or a third party, and not the customer, who may only deposit funds in this account in the process of making a purchase for an item using embodiments of the disclosed technology, as, in step 120, this account being associated with the method of the disclosed technology which precludes regular usage other than the features described above. In either case, once the funds are set aside for a purchase and a promissory note is issued, as will be described below, the customer is precluded from removing the funds or retracting an issued promissory note (absent fraud, theft, or violations of other federal or state laws).

Depending on the embodiment, payment for the item is either made directly from the buyer to seller (step 130) or from the buyer into the account (135). Payment may also be made instead or additionally through a third party payment processor. In any of these cases, once payment is made, in embodiments of the disclosed technology, step 140 is carried out, whereby payment is received into the account created in step 110. In some cases, bank fees and other transaction fees will apply. For example, credit card fees may be in the amount of about 3% of the purchase price, and check processing fees may be up to about $1, as currently known in the art in the United States. Generally, the seller bears the costs of these fees. This issue will be discussed further with regard to step 170.

Then, in step 150, the seller is notified, or payment is confirmed to the seller, that payment has been received (which includes an irrevocable "in transit" status of the funds, absent fraud or other violations of local law). This notification may occur by way of a credit card terminal, computer terminal, printed receipt, phone call, text message, or the like, to the seller. It may also be accompanied by digital or printed delivery of a promissory note in step 160, where the payment is guaranteed. This guarantee may be provided by the financial institution where the payment resides, a third party payment processor of the funds, or even a third party whose sole function in this transaction is to issue and/or guarantee the promissory notes, and/or that the funds will be transferred to the seller at a later date.

In step 170, the anticipated interest is calculated from the funds are held in the account (the account being the account created in step 110). For example, the regular bank rates of interest may be 4%. So on a $10,000 purchase, the interest is $400. However, transaction fees, in embodiments of the disclosed technology, reduce the actual value of the account. Thus, for example, with a credit card purchase having fees of 3%, $300 goes to the credit card company. As such, the 4% interest received is only on $9,700, which amounts to, in this example, $388. As such, the customer is not only incentivized to make purchases because he/she benefits from interest on the money, but is further incentivized to use payment methods which have lower transaction costs. In some embodiments, high transaction cost payment methods may be disallowed. However, even if allowed, the seller's position becomes aligned with the buyer's to use low cost transaction methods. A seller receiving a payment through embodiments of the disclosed technology may come out ahead or break even, because a customer who might have purchased with a credit card now makes the purchase using a check or bank wire, and thus any loss by being paid at a later date is more than offset by receiving a payment by way of a method with minor or no transaction fees. This is especially true when interest rates are low, since the loss to the seller from the delay of cash on hand is minimal, whereas the gain in incentivizing buyers to avoid high cost transaction methods is constant.

In step 180, credit or points based on the anticipated interest are given to the buyer. That is, in the above example, where $400 interest is anticipated, this amount or a part thereof is credited to the customer. In a first embodiment, this credit is in the form of "reward points," such as one point for every dollar of anticipated interest. For $400, 400 points might be issued. These points, in this embodiment, are immediately redeemable for the purchase of further goods, such as $400 worth of a second item from the seller or another retailer/seller. In this manner, the customer actually realizes the gain on interest immediately.

In embodiments of the disclosed technology, the reward points are granted for only a portion of the interest which will be earned (or the interest given is less than that which is offered by the bank) to the buyer. For example, 75% of the interest (or a displayed interest rate of 75% of the actual rate offered) is rewarded in points. That is, for $400 of anticipated interest, 300 points are given. (Or, an interest rate is shown as 3% instead of 4%, yielding the same result.) The portion which is not granted goes towards any one of, or is divided amongst, a licensor of the disclosed technology, a payment processor who carries out embodiments of the disclosed technology, and/or an insurer of the promissory note. It should be understood that these entities may be one and the same. That is, the payment processor may be the insurer who may be the licensor, etc.

In another embodiment, users may invest the money in their account or it may be automatically invested, as chosen by the payment processor or entity administering the system. Thus, for example, all such funds may be invested in a one year CD (certificate of deposit) available at the financial institution of the customer or other long term security. Thus, a financial institution may advertise that its customers may open accounts and make payments with a check or debit card which automatically transfers the funds, not to the seller of an item, but to a one year CD. ACH (automated clearing house) or bank wire transfers may also be used. The customer gets to keep the interest (as a dollar value paid immediately or upon maturity of the CD), and the seller gets the principal once the CD matures. Again, the reward to the customer may be only a portion of the interest, such as 75% of it, whereas the remaining 25% is diverted.

Once the extended term for which the money is held by the buyer expires, such as after three months, six months, one year, or any other term that the financial institution of the customer allows for (and the seller accepts in the form of a promissory note), then, in step 190, the payment which was received in step 140 is withdrawn and transferred to the seller. That is, the seller receives payment for the item which was delivered at the beginning of the term/when payment was made by the buyer into the account, or designated solely to go to the seller by way of the financial account created in step 110.

Figure 2:
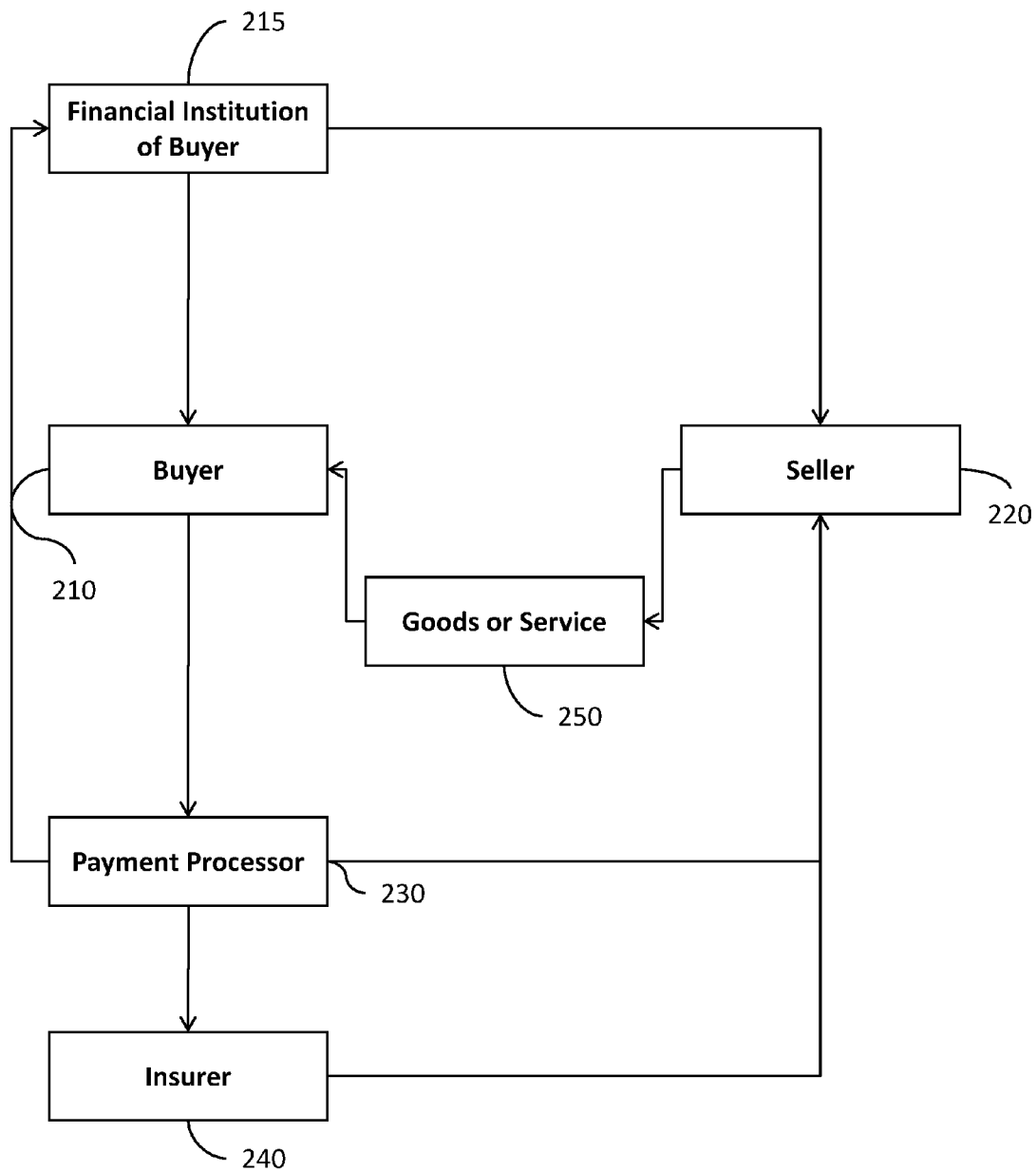
FIG. 2 shows a high level block diagram of devices and entities which are used to carry out the delayed payment method of embodiments of the disclosed technology.

FIG. 2 shows a high level block diagram of devices and entities which are used to carry out the delayed payment method of embodiments of the disclosed technology. The areas shown are common pathways of interaction between the devices and entities listed, but are not the only pathways. A buyer 210 desires to purchase a good or service (an item) 250 from a seller 220. The buyer 210, by way of a payment processor 230, makes a payment in the amount of the purchase price of the product. The payment processor 230 may be any one of a payment terminal operated by the seller 220 (such as a credit card machine or computer terminal accepting payment with bank routing information and account number or the like), an electronic payment device such as a handheld computer with internet connection, a phone system handling a phone authorization to make such a payment, or the like. The payment processor may also be an entity such as the financial institution of the buyer and seller processing a check payment, or the like.

When payment is negotiated, the funds may pass through an account of the seller or be transferred directly from a buyer's other account to a specific account at the financial institution of the buyer 215, designated for this purpose. The funds in this account become frozen (unable to be moved by the buyer or seller) for a period of time. The seller then transfers the goods or provides the service 250 to the buyer, and a promissory note is issued to the seller by an insurer 240 or directly by the payment processor 230. The functions described in this paragraph may occur in any order or in the order written, any one of which may take place as soon as the buyer 210 directs the payment processor 230 to make payment from a first account (or credit card) into an account of the seller 220, as an intermediate step towards, or to, an account designated for this purpose at the financial institution of the buyer 215.

The payment then resides in a specially set up account for the purposes of this transaction at the financial institution of the buyer 215. It remains there for an extended period of time (e.g., one year) while points are issued by the insurer 240, other service provider, or financial institution of the buyer 215. These points, as described in FIG. 1, are redeemable, in embodiments of the disclosed technology, to make further purchases and are based on the interest anticipated to be accrued in the account from the payment. The insurer 240, other service provider, financial institution of the buyer 215, or other entity may earn some of the interest or be awarded some of the points, such as 25% of the points/interest.

Once the extended period of time expires, the funds are transferred from the financial institution of the buyer 215 to the seller 220 by ACH, bank wire, check, or the like.

In an example of an embodiment of the disclosed technology, Mr. Tom Smith holds a card with access to an account designated for making purchases, the funds to be paid to the seller only after an extended period of time. The seller holds an account, at the same or a different financial institution, which is linked to this payment system. This may be a separate account or part of a general purpose account. When Mr. Smith opens his account, he consents to a third party holding 25% of interest earned in the account (or points) whilst his funds are awaiting transfer to the seller. Mr. Smith can view the balance of this account through statement or online access, as well as the expected date of transfer of funds to a seller from whom he has purchased a product. Mr. Smith visits a participating business and purchases a new car. Car sellers, by way of example, often offer 0% interest lease programs, so such a program, which might afford them full payment after a year (as opposed to five years) may actually be financially beneficial to them for this reason alone. At the same time, the buyer's money is transferred into his designated account, where the interest is returned to him as points to be used on further purchases. The business may settle and clear Mr. Smith's transaction, with Mr. Smith's paying the bank, and then deposit the funds into Mr. Smith's account set up for the purpose of holding the funds and collecting points. The business will receive a long term promissory note with a maturity date at the expiration of the extended period of time, and maturity value for the amount paid (minus transaction fees, if any).

Figure 3:
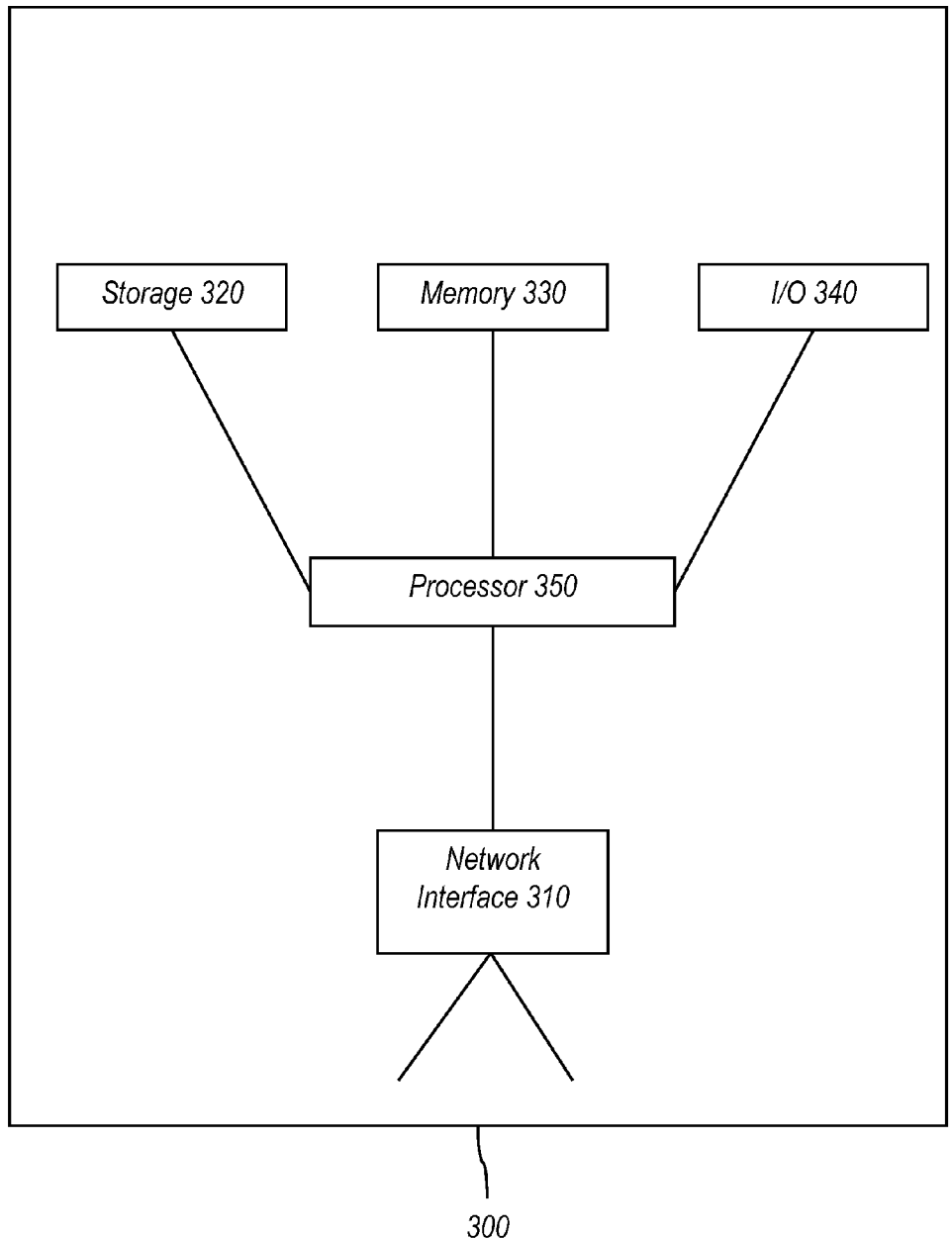
FIG. 3 is a high-level block diagram of a computational device that may be used to carry out the disclosed technology.

FIG. 3 is a high-level block diagram of a computational device that may be used to carry out the disclosed technology. Computer device 300 comprises a processor 350 that controls the overall operation of the computer by executing the entered program instructions which define such operation. The program instructions may be stored in a storage device 320 (e.g., magnetic disk, database) and loaded into memory 330 when execution of program instructions is desired. Thus, the computer's operation will be defined by the program instructions stored in memory 330 and/or storage 320, and the console will be controlled by processor 350 executing the program instructions. A computer 300 also includes one or a plurality of input network interfaces for communicating with other devices via a network (e.g., the Internet). The computer 300 further includes an electrical input interface for receiving power and data from a wired or wireless source. A computer 300 also includes one or more output network interfaces 310 for communicating with other devices. Computer 300 also includes input/output 340 representing devices which allow for user interaction with a computer (e.g., display, keyboard, mouse, speakers, buttons, stylus, etc.). One skilled in the art will recognize that an implementation of an actual device will contain other components as well, and that FIG. 3 is a high level representation of some of the components of such a device for illustrative purposes. It should also be understood by one skilled in the art that the method and devices depicted in FIGS. 1 and 2 may be implemented on a device such as is shown in FIG. 3.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the disclosed technology.

We claim:

1. A payment intermediary comprising:
    using a processor to receive funds into an account for purchase of an item;
    means for generating a promissory note to a vendor of said item when said funds are received;
    as a result of said receiving of said funds, using a processor to associate points to a purchaser of said item, said points corresponding to at least a part of said anticipated interest to accrue in said account until said promissory note is redeemable; and
    means for making said points available to said purchaser for purchase of further goods when said promissory note is issued.

2. The payment intermediary of claim 1, further comprising means for verifying delivery of said item to a purchaser.

3. The payment intermediary of claim 1, wherein a portion of funds associated with said anticipated interest is transferred to a third party.

4. The payment intermediary of claim 3, wherein at least said part of said anticipated interest is the entire anticipated interest minus said portion transferred to said third party.

5. The payment intermediary of claim 4, wherein said portion transferred to said third party is 25% of said anticipated interest, and said points are 75% of said anticipated interest and are issued to said owner of said account immediately upon said funds being received.

6. The payment intermediary of claim 5, wherein said promissory note is redeemable after one year.

7. A method of selling an item, comprising:
    offering an item for sale;
    receiving payment from a customer for purchase of said item;
    based on customer instructions, using a processor carrying out instructions to transfer said payment to a financial account associated with said customer at a financial institution having a business relationship with said customer;
    receiving a promissory note for the value of said payment, said promissory note guaranteed by a third party;
    delivering said item to a purchaser;
    redeeming said promissory note by way of a processor; and
    notifying said customer of reward points for said transaction, wherein said reward points are based on interest generated by said payment while said payment resides in said financial account.

8. The method of selling an item of claim 7, wherein a portion of interest generated from said financial account is diverted to said third party.

9. The method of selling an item of claim 7, wherein said method of receiving payment is selected from the group consisting of credit cards, debit cards, and checks.

10. The method of selling an item of claim 7, wherein said method of receiving payment is by way of previously issued said reward points to said customer.

11. A method of deferring payment to a seller and rewarding a buyer, comprising the steps of, in order:
    maintaining, an account at a financial institution, said account associated with said buyer;
    negotiating the receipt of payment into said account, said payment to be used for purchase of an item sold by said seller;
    notifying, via instructions to a processor, said seller of said payment, wherein said seller delivers said item to said buyer;
    guaranteeing payment to said seller for said item, said payment for said item to be made after an extended period of time;
    calculating, via instructions to a processor, anticipated interest on said payment until said extended period of time lapses;
    issuing credit to said buyer in a separate account, said credit to be used for additional purchases, and said credit being a percentage of said anticipated interest.

12. The method of claim 11, wherein said extended period of time is one year.

13. The method of claim 11, wherein a further payment of a percentage of said interest is paid to a third party.

14. The method of claim 11, wherein said further payment to said third party also guarantees said payment.

15. The method of claim 11, wherein said payment is first received into an account associated with said seller before said step of receiving payment into an account associated with the buyer.

16. The method of claim 15, wherein said account associated with said seller is an account for receipt of payments made by check or credit card in the seller's regular course of business.

17. The method of claim 11, wherein said credit is in the form of reward points.

18. The method of claim 17, wherein said reward points are used to offset the cost of said item to said buyer.

19. The method of claim 17, wherein bank processing fees are deducted from said reward points issued to said buyer.

\* \* \* \* \*